Nov. 1, 1966 F. M. MANION 3,282,279

INPUT AND CONTROL SYSTEMS FOR STAGED FLUID AMPLIFIERS

Filed Dec. 10, 1963 3 Sheets-Sheet 1

INVENTOR.
FRANCIS M. MANION
BY Hurvitz & Rose
ATTORNEYS

INPUT AND CONTROL SYSTEMS FOR STAGED FLUID AMPLIFIERS

Filed Dec. 10, 1963

INVENTOR
FRANCIS M. MANION

BY Hurvitz & Rose
ATTORNEYS

Nov. 1, 1966 F. M. MANION 3,282,279
INPUT AND CONTROL SYSTEMS FOR STAGED FLUID AMPLIFIERS
Filed Dec. 10, 1963 3 Sheets-Sheet 3
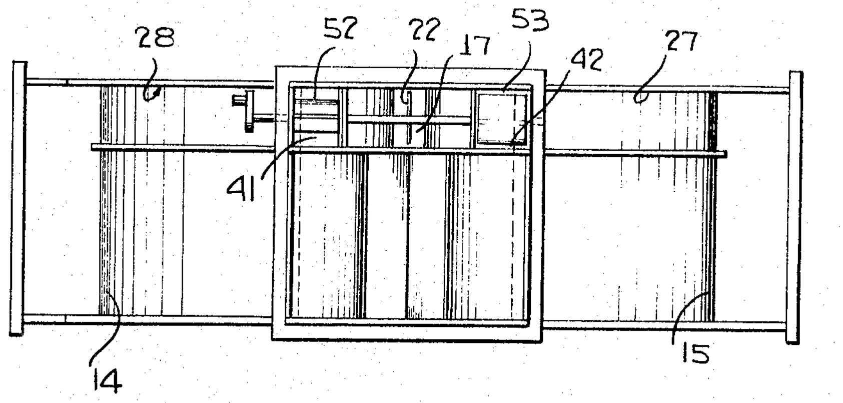
FIG. 4
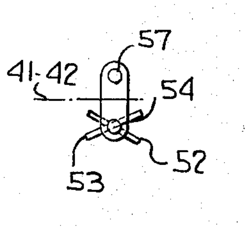
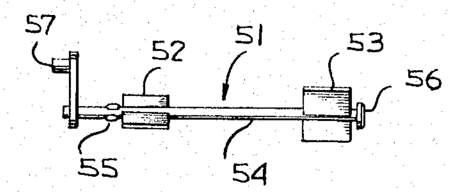
FIG. 6
FIG. 5
INVENTOR
FRANCIS M. MANION
BY Hurvitz & Rose
ATTORNEYS United States Patent Office 3,282,279

Patented Nov. 1, 1966

3,282,279
INPUT AND CONTROL SYSTEMS FOR STAGED FLUID AMPLIFIERS

Francis M. Manion, Rockville, Md., assignor to Bowles Engineering Corporation, Silver Spring, Md., a corporation of Maryland Filed Dec. 10, 1963, Ser. No. 329,439
8 Claims. (Cl. 137—81.5)

This invention relates generally to input and control systems for staged or cascaded fluid amplifying systems, and more specificially, this invention relates to a differential valve system for providing differential control for the control nozzles of a first stage of a two stage fluid amplifying system without varying the total volume of fluid input supplied to the control and power nozzles of both amplifying stages.

Fluid amplifiers of the beam deflection type such as disclosed in U.S. Patents No. 3,016,066 and No. 3,024,805 are formed by a structure of two or more plates sealed one to the other in a fluid-tight relationship by adhesives, machine screws, welding or other suitable means. If increased gain beyond that available from one such amplifier is desired, two or more fluid amplifiers may be coupled or stage together such that each succesive stage is coupled to the previous stage. The output passages of the first stage are coupled to supply fluid control signals to control nozzles of the second stage whereby the larger power stream employed in the second stage is controlled by the smaller output signals issuing from the first stage. The number of stages utilized is ordinarily governed by the gain desired from the staged amplifying system.

In the interest of providing a compact fluid amplifying unit incorporating two or more amplifying stages it is common practice to mount the first stage parallel to and on the second stage so that the resulting structure is compact, the coupling between stages being accomplished by suitable intercoupling chambers. In the particular configuration with which the apparatus of the present invention is concerned, the two or more amplifying stages have two or more power nozzles that receive fluid along with the control nozzles embodied in the first amplifying stage. If manifolds or connecting passages were employed to supply fluid to each power and control nozzle, the size of the manifold or number of passages would not only become excessive but would materially increase the overall size of the staged unit. Obviously, it would also be advantageous from the standpoint of unit compactness if a single fluid source could serve to supply fluid directly not only to the power nozzles but to the control nozzles as well. Problems arise in the design of such a common source system in the apparatus with which the present invention is concerned because the flow through or the pressure in the control nozzles is varied by mechanical valves to produce fluid control signals that vary in accordance with variations in the output of a mechanical, electro-mechanical or other type of control mechanism. As the valves are displaced, to vary the area of the control passage so as to vary the pressure or mass flow of the fluid issuing from the control nozzle output orifice, the back loading on the common fluid supply or source upstream of the valves also fluctuates causing fluctuations in the volume of input fluid supplied to the power nozzles. The volume of flow to the power nozzles however must be maintained constant if the operating characteristics of the amplifier stages are to remain constant.

Thus the problem exists in staging two or more amplifiers together in a stacked structure having a common fluid input duct for supplying fluid from a single source to two or more control and power nozzles, of maintaining the volume and pressure of flow from the duct to the power nozzles constant while the volume of flow to each control nozzle is being varied by movement of the valving system.

Broadly, it is an object of this invention to provide an internal control mechanism for varying the volume of flow from a pair of control nozzles formed in one stage of a plural stage fluid amplifying system in accordance with external control signals applied to the control mechanism without varying the total volume of flow supplied simultaneously to both nozzles.

More specifically, it is an object of this invention to provide a supply and a control system for a pair of staged fluid amplifiers having at least two control and power nozzles, the supply system comprising a single duct common to all nozzles for supplying a total constant volume of fluid to all nozzles simultaneously, in spite of the fact that the control system includes variable position valves in the control nozzles for varying the volume of flow from each control nozzle in accordance with external control signals supplied to the valves.

According to this invention, a pair of pure fluid amplifiers are staged in a stacked structure, the amplifiers including at least two power and two control nozzles. A common input duct encloses the input ends of the power nozzles and the input ends of the control nozzles of the first stage and supplies a constant volume of flow to all input ends simultaneously. A valving system comprising a pair of flapper valves are incorporated in the two control nozzles and vary the volume of flow from the control nozzles differentially in accordance with the displacement of the valves by external control devices connected to the valves. The differential valves are, in accordance with the invention, arranged to provide a total constant area to flow from the input duct so that the volume of flow supplied to all nozzles is not varied by valve operation and therefore fluid supplied to the power nozzles is uneffected by the control function.

The angular displacement of the valves in their associated passages is such that there is a linear variation in flow area with rotation of the flappers, a desirable result in many flow control systems. Further the flappers of the valves are positioned relative to their associated passages so that in their open position they provide an impedance to flow roughly equal to that provided by their associated control nozzles so that the valves have an immediate, noticeable effect on flow through the nozzles upon closing of the valve.

It is yet another object of the present invention to provide a pair of flapper valves in asociated control passages of a fluid amplifier in which variations in area with rotation of the flappers are equal and opposite and may be linear functions of rotation.

Still another object of the present invention is to provide a fluid amplifier having flapper valves in the control nozzle supply passages which valves their maximun permissible open position provide roughly the same impedance to fluid flow as their associated nozzles.

The above and still further objects, features and advantages of the present invention will be come apparent upon consideration of the following detailed description of one specific embodiment thereof, especially when taken in conjunction with the accompanying drawings, wherein:

FIGURE 4 is an end view of the system shown in FIGURE 1 with the fluid supply source and a control means for actuating a differential valving system removed for the purposes of clarity;

FIGURE 5 is a plan view of a differential valve utilized in accordance with this invention to vary the volume of control fluid supplied by the control nozzles of the first amplifier stage; and FIGURE 6 is a schematic side view in elevation of the flapper valves.

Referring now to the accompanying drawings for a more complete understanding of the present invention, the numeral 10 designates a two-stage amplifier formed by a plurality of flat plates secured one to the other in a fluid-tight relationship by adhesives, machine screws, welding or any other suitable means. The plates forming the staged amplifier 10 are illustrated as clear plastic material for purposes of clarity although any material compatible with the working fluid employed in the staged amplifier 10 may be used alternatively.

Figure 1:
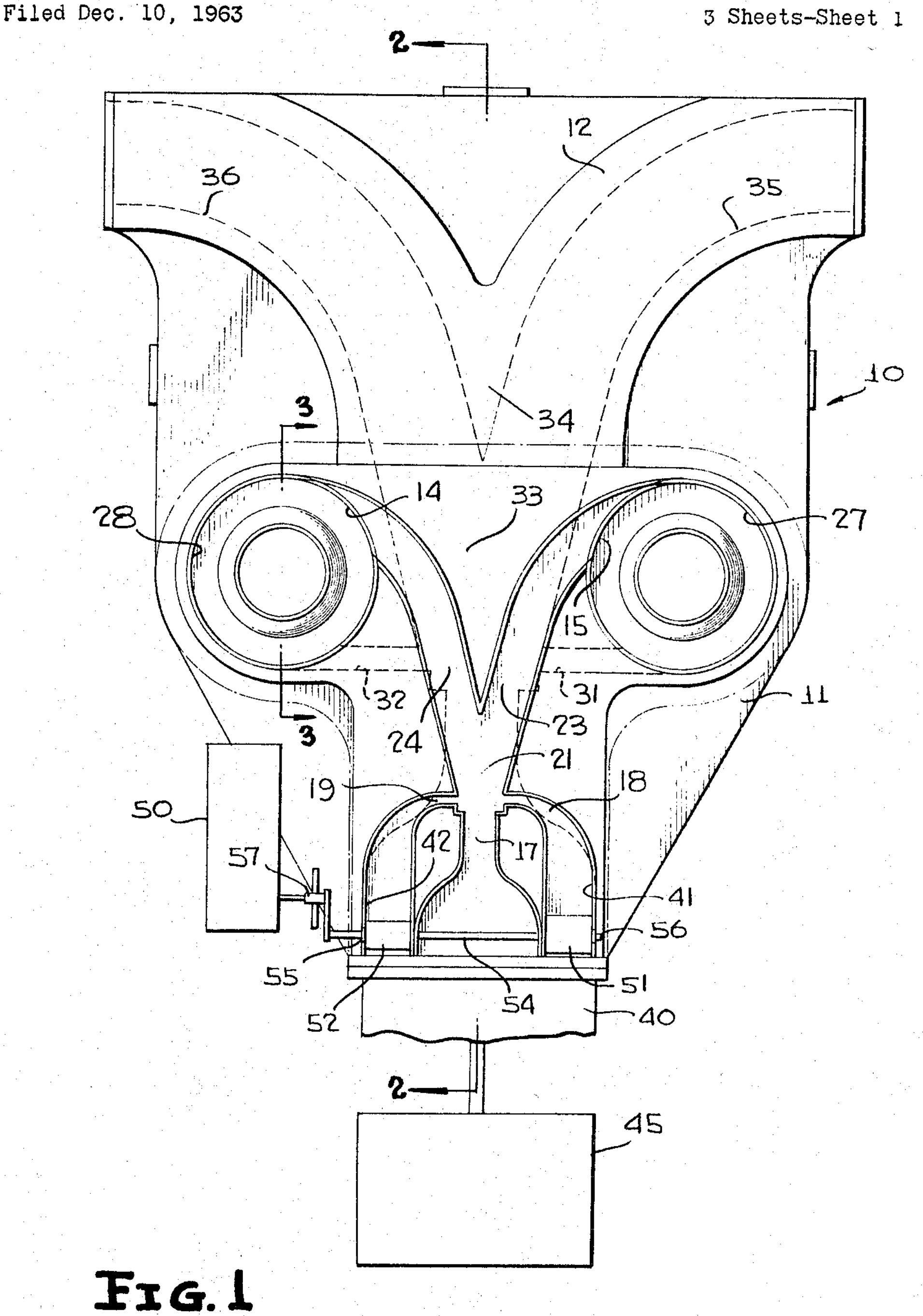
FIGURE 1 illustrates a plan view of the fluid input system of this invention in combination with a pair of staged pure fluid amplifiers.
Figures 2, 3:
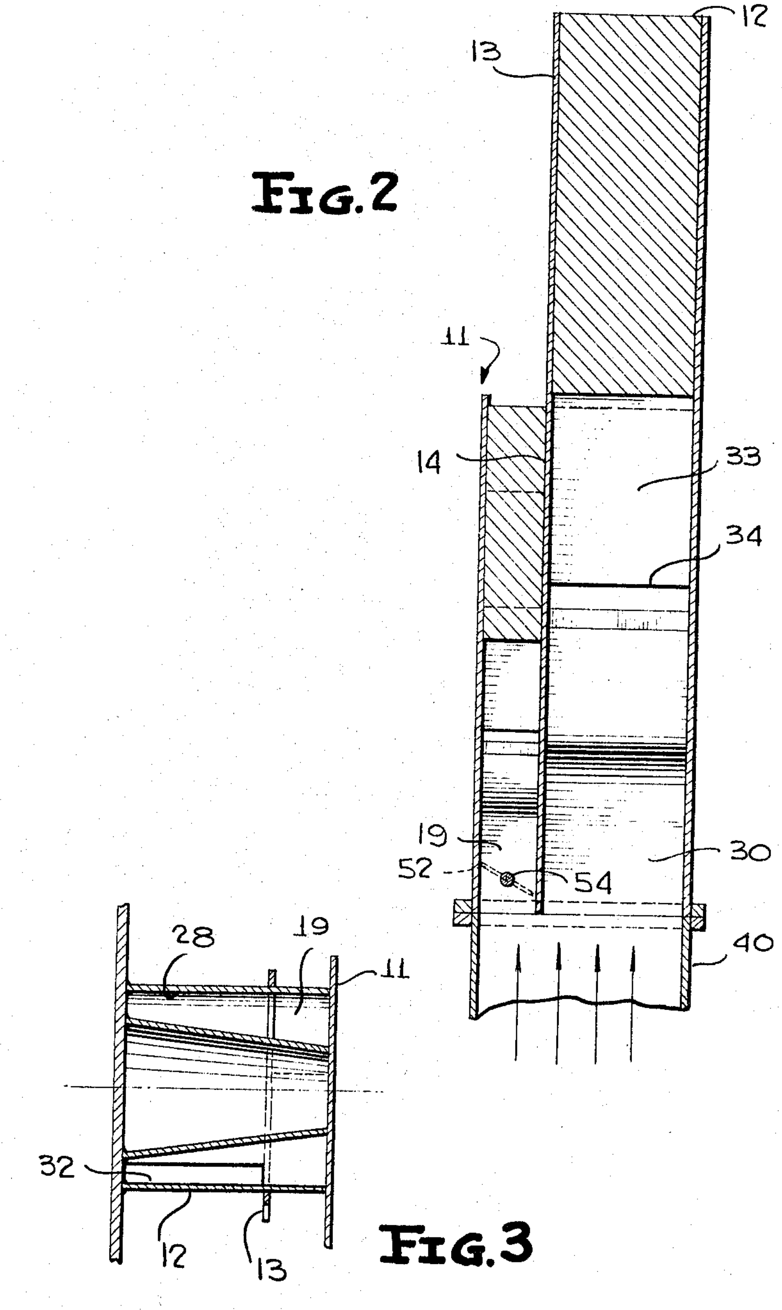
FIGURE 2 is a sectional side view taken along section line 2—2 of FIGURE 1.
FIGURE 3 is a sectional view of a fluid transfer chamber, the view taken along section line 3—3 of FIGURE 1.

Referring now to FIGURE 2 of the accompanying drawings, the first stage of the amplifier is designated by the numeral 11 and the second stage by the numeral 12, both stages being separated over the major portions of their contacting surfaces by a flat plate 13. The plate 13 is formed with a pair of circular openings or bores 14 and 15, FIGURES 1 and 3, and through these openings fluid from the first stage is supplied as control fluid to the second stage. The fluid amplifier 11 includes a power nozzle 17, FIGURE 1, a pair of opposed control nozzles 18 and 19, an interaction chamber 21, a flow splitter 22 for dividing flow from the chamber 21 into a pair of diverging outlet passages 23 and 24, the outlet passages 23 and 24 supplying fluid tangentially to transfer chambers 27 and 28, respectively.

Similarly, the upper half of the amplifier 12 is provided with a power nozzle 30, a pair of opposed control nozzles 31 and 32, FIGURES 1 and 2, an interaction chamber 33, a flow splitter 34, and a pair of diverging outlet passages 35 and 36.

As is well known to those working in the art, the high energy power stream issuing from the power nozzle 17 of the amplifier 11 is directionally displaced relative to the flow splitter 22 by low energy control streams issuing from the control nozzles 18 and 19 so that amplification of fluid control signals from the control nozzles is effected in the amplifier 11. In order to provide the desired gain between the two stages, the dimensions of the amplifier 12 are considerably greater than the corresponding dimensions of the amplifier 11. The low energy fluid from the output passages 23 and 24 of the amplifier 11 is transferred to the control nozzles 31 and 32 of the amplifier 12 and effects amplified directional displacement of the high energy power stream issuing from the power nozzle 30 of the second stage. Thus, a power gain is effected by intercoupling the stages through cylindrical chamber 27 and 28. For the purposes of this invention the fluid amplifiers may as a matter of choice, be of the stream interaction type, as disclosed in U.S. Patent No. 3,024,805 or of the boundary layer type, as disclosed in U.S. Patent No. 3,016,066.

The intercoupling chambers 27 and 25 form the subject matter of my copending application Serial No. 325,029 filed November 20, 1963. For purposes of this application it is sufficient to say that the linear fluid flow issuing from the output passages 23 and 24 is converted to rotating flow by the cylindrical chambers 27 and 28 respectively, the periphery of the chambers 27 and 28 receiving the fluid flow tangentially thereof so as to provide a relatively smooth transition to the change in flow direction. The control nozzles 31 and 32 of the amplifier 12 extend tangentially from the periphery of the chambers 27 and 28, respectively, and receive the tangential velocity components of the fluid rotating axially through the chambers 27 and 28. The fluid is received by the nozzles 31 and 32 as essentially linear fluid streams and issues from the control nozzles 31 and 32 as such to effect amplified directional displacement of the larger energized power stream issuing from the power nozzle 30 relative to the outlet passages 35 and 36. The output from the outlet passages 35 and 36 of the power nozzle 30 of the amplifier 12 may be used to operate or control the operation of other types of devices employing fluid for their operation or control, or if so desired the output from the passages 35 and 36 may be again amplified by another fluid amplifying stage in the same manner that the amplifier 11 is staged with the amplifier 12.

The problems involved in connecting the inputs to the two power and two control nozzles will become apparent when it is realized that in order to ensure that the operating characteristics of the staged amplifier 10 remain constant, the volume of flow supplied to the power nozzles 17 and 30 must also remain constant. It will also be appreciated that in order for the amplifiers to function, the volume of flow from the control nozzles 18 and 19 must be varied in accordance with displacements of a suitable flow or pressure controlling mechanism or device. It would appear therefore that the power nozzles should be connected to a source capable of maintaining a constant-volume, constant-pressure flow whereas, the control nozzles 18 and 19 should be individually connected to other individual sources capable of supplying a constant volume of flow in spite of changes of backloading produced by the mechanism for varying the control stream flow so that variations of flow in one control nozzle will not adversely vary the volume of flow supplied to the other control nozzle, nor affect the volume or pressure of flow supplied to the power nozzle. Obviouly, however, it would be advantageous if all the power and control nozzles could receive fluid from a single source of regulated volume and pressure supplied by means of a single duct connected to the input end of the amplifier 10.

For many fluid amplifier applications it is only requisite that the displacement of the power stream in the first amplifier stage be a function of the movement or displacement of a linkage or cam representing the rotational or linear output of a device controlling the fluid amplifier. For this type of application it is possible, in accordance with the principles of this invention, to provide a differential valving system that will affect amplified displacement of the power stream in the first amplifier stage corresponding to the direction and magnitude of displacement of the valving system while maintaining a constant value of fluid flow thereby to permit the utilization of a single input source for supplying fluid to all power and control nozzles of both amplifier stages.

To this end, a single duct 40, FIGURES 1 and 2, of rectangular cross section is positioned to supply fluid to the mutually parallel input ducts 41 and 42 of the control nozzles 18 and 19, respectively, as well as the input ends of the power nozzles 17 and 30 from a source 45 capable of producing a constant volume of flow. The upstream end of the duct 40 may be secured in the input end of the structure of the system 10 by suitable means. The upstream or input ends of the control nozzles 18 and 19 and the power nozzles 17 and 30 may be alternately provided with individual input tubes that extend a short distance from the end of the amplifying system 10 and terminate in a common input duct or tube. A differential valving system 51, FIGURE 5, is provided to produce differentials in flow and pressure of fluid issuing from the nozzles 18 and 19 without varying the overall differential in blockage to flow with the input ends 41 and 42 and without varying the volume of fluid simultaneously received by the power nozzles 17 and 30.

Referring now to FIGURES 5 and 6, it can be seen that the differential valving system 51 comprises a pair or rectangular vanes 52 and 53, the ends thereof preferably tapered to leading and trailing edges so as to prevent the generation of perturbations in the flow through the control nozzles. The vanes 52 and 53 are secured to a rod 54 and are positioned at 30° with respect to each other; the diameter of the rod 54 being so small relative to the size of the power nozzle 17 and passages 41 and 42 that the resistance to flow offered by the rod is negligible. One end of the rod 54 is provided with a head 56 of circular shape which serves to prevent axial movement of the rod 54 in one direction in the amplifier 11. A portion of the other end of the rod 54 is flattened to form lobe 55 which serve to prevent axial movement of the rod 54 in a direction opposite said one direction. A cam or linkage 57 is connected to one end of the rod 54 to effect angular displacement of the rod in response to linear or angular displacement of a control device 50, FIGURE 1.

As previously indicated the vanes 52 and 53 lie at an angle of 30° relative to one another. The relative sizes of the vanes 52 and 53 and the passages 41 and 42, respectively, in which they are positioned are such that when one vane lies at an angle of 30° to the top and bottom walls, as viewed in FIGURE 6, of its associated passage 41 or 42, the other vane completely closes its associated passage. For instance, if vane 53 closes its passage 42, the vane 52 lies at 30° relative to the top and bottom walls of its passage 41 and the passage is open to the maximum extent permitted. If the position of the vanes is changed then the passage 42 is open to the full extent permitted, and the passage 41 is completely closed.

The reason for positioning the vanes as indicated above is that the areas of fluid flow in the passages 41 and 42 vary as a sine functions with movement of the vanes 52 and 53. A sine function is substatnially linear over the range from 30° to 60° and therefore in the present case the variation in area in passages 41 and 42 varies as a linear function of the rotation of shaft 54, an obviously desirable result. If linearity is not required, the total volume of flow may be maintained relatively constant so long as operation of the device is over a portion of a function which is relatively flat and symmetrical about the median position of the flappers; that is, the half-open, half-closed position which occurs at the same time for both.

Another important consideration relative to the present invention is the relative impedances to flow in the regions of the flapper value and its associated nozzle. If, for instance, the impedance of the nozzle is considerably larger than the impendance in the reigon of the valve when it is open to maximum extent, then the flapper during initial movement toward its closed position has little effect on the total flow while towards the final stages of closing it has an increasingly rapid effect. Thus linearity is completely lost. However if the impedance to fluid flow in the region of the nozzle and flapper are about equal when the valve is open to its maximum permissable extent, far better regulation and far more nearly linear results are obtained.

Continuing, the mass flow required to produce maximum deflection of the device is known from the basic design of the amplifier. Since the total resistance to flow is the sum of the two flow impedances discussed above, the area of the control nozzle must be increased such that the total impedance to flow through the valve and nozzle still permits the desired maximum mass flow. It is known that pressure drop ($P_D$) is equated to velocity (V) as follows:

$$P_D=KV^2 \qquad (1)$$

where K is a constant. Also volume of flow (Vol.) is related to velocity (V) and area (A) as follows:

$$\text{Vol.}=AV. \qquad (2)$$

Thus it follows for Equations 1 and 2 above that the area of the nozzle must be increased by $\sqrt{2}$ over that which would be required in the absence of the flapper value.

It is seen from the above that the present invention provides the ability to supply the two power nozzles and two control nozzles of the first stage from a single flow source which maintaining constant flow even though the areas of the ducts to the control valves of the first stage vary. Further the total and incremental variations of flow in a given control channel may be closely controlled and related to the desired input function, thereby imparting a high degree of flexibility to the system.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In combination, first and second staged fluid amplifiers, said amplifiers including power nozzles arranged adjacent one another, said first amplifier having control nozzles positioned to deflect their associated power stream in opposite directions, fluid supply passages for said control nozzles being arranged adjacent said power nozzles, fluid supply means for supplying a constant-volume fluid to the upstream ends of said passages and said power nozzles, and fluid control means mounted in said two passages for varying the quantity of fluid received by said control nozzles such that the total flow to said passages remains generally constant over the operating range of said fluid control means.

2. The system as claimed in claim 1 wherein said fluid control means comprises a pair of rotatable vanes each mounted in a different one of said passages.

3. The system as claimed in claim 2 wherein means are provided for concurrently rotating said vanes such that the reduction of flow area in one of said passages is equal to the increase in flow area in the other of said passages.

4. A fluid system comprising first and second fluid amplifier units of substantially rectangular shape stacked together in a fluid-tight relationship, each amplifier including a power nozzle for issuing a defined power stream therefrom, plural output passages having entrances located downstream of said power nozzle for receiving fluid from the power stream, plural control nozzles formed in each amplifier angularly positioned relative to the power nozzle for effecting displacement of the power stream relative to the entrance of said output passages in opposite directions, means for coupling each output passage of the first amplifier to a control nozzle of the second amplifier, input duct means supplying fluid to each power nozzle and said control nozzles of said first amplifying unit, a common fluid source for supplying a constant volume of fluid to said duct means, and differential valve means mounted in each control nozzle of the first stage of said first fluid amplifier, said differential valve means being constructed such that total volume of fluid flow from said source is substantially constant.

5. In combination, first and second staged fluid amplifiers, said amplifiers including power nozzles arranged adjacent one another, said first amplifier having control nozzles positioned to deflect their associated power stream in opposite directions, fluid supply passages of said control nozzles being arranged adjacent said power nozzles, fluid supply means for supplying a constant-volume fluid to the upstream ends of said passages and said power nozzles, and a rotatable shaft extending across both said passages, a pair of vanes each secured to said shaft in a different one of said passages, said vanes being positioned on such shaft such that they lie at 30° relative to each other and close their associated passages when lying at 60° relative to the longitudinal centerline of said passages.

6. In combination, first and second staged fluid amplifiers, said amplifiers including power nozzles arranged adjacent one another, said first amplifier having control nozzles positioned to deflect their associated power stream in opposite directions, fluid supply passages for said control nozzles being arranged adjacent said power nozzles, fluid supply means for supplying a constant-volume fluid to the upstream ends of said passages and said power nozzles, and a pair of rotatable vanes each mounted in a different one of said passages, means for concurrently rotating said vanes such that the reduction of flow area in one of said passages is equal to the increase in flow area in the other of said areas, said vanes being of such a size relative to the size of said passages that the impedance to flow of fluid presented by each of said vanes when in its maximum open position is approximately equal to the impedance to flow of each of said control nozzles.

7. A fluid system for delivering a constant volume of fluid comprising a fluid amplifier having a power nozzle, a pair of output channels and a pair of control nozzles disposed on opposite sides of said power nozzle for deflecting a stream of fluid issued by said power nozzle as a function of a differential in fluid flow to said control nozzles, a different fluid passage connected to each of said nozzles, each of said passages having a fluid ingress opening, all of said ingress openings lying in a common plane, means for supplying fluid flow across said plane and into each of said ingress openings, and means for differentially varying fluid flow through said control nozzles such that the total volume of flow across said plane is constant in the presence of a constant volume of flow supplied to said plane by said means for supplying.

8. A fluid system for delivering a constant volume of fluid comprising a fluid amplifier having a power nozzle, a pair of output channels and a pair of control nozzles disposed on opposite sides of said power nozzle for deflecting a stream of fluid issued by said power nozzle as a function of a differential in fluid flow to said control nozzles, a different fluid passage connected to each of said nozzles, each of said passages having a fluid ingress opening, all of said ingress openings lying parallel to a common plane, means for supplying fluid flow across said plane and into each of said ingress openings, and means for differentially varying fluid flow through said control nozzles such that the total volume of flow across said plane is constant in the presence of a constant volume of flow supplied to said plane by said means for supplying.

References Cited by the Examiner

UNITED STATES PATENTS

| | | | |
|---|---|---|---|
| 913,632 | 2/1909 | Foster | 137—609 |
| 2,699,106 | 1/1955 | Hoyer | 137—609 |
| 3,147,773 | 9/1964 | Matthews et al. | 251—305 |
| 3,170,476 | 2/1965 | Reilly | 137—81.5 |
| 3,171,421 | 3/1965 | Joesting | 137—81.5 |
| 3,191,858 | 6/1965 | Sowers | 137—81.5 |
| 3,206,928 | 9/1965 | Moore | 137—81.5 |
| 3,207,168 | 9/1965 | Warren | 137—81.5 |

M. CARY NELSON, *Primary Examiner.*

W. CLINE, *Assistant Examiner.*